United States Patent [19]

Yamada et al.

[11] Patent Number: 5,057,924
[45] Date of Patent: Oct. 15, 1991

[54] ELECTRONIC STILL CAMERA FOR CONVERTING AND RECORDING STILL IMAGE SIGNAL INTO A PLURALITY OF STREAMS

[75] Inventors: Hidetoshi Yamada, Tokyo; Tatsuo Nagasaki, Yokohama, both of Japan

[73] Assignee: Olympus Optical Co., Ltd., Tokyo, Japan

[21] Appl. No.: 508,932

[22] Filed: Apr. 12, 1990

[30] Foreign Application Priority Data

Apr. 26, 1989 [JP] Japan ................................. 1-106679

[51] Int. Cl.$^5$ ............................................. H04N 5/30
[52] U.S. Cl. ..................... 358/209; 358/909; 358/906; 358/335
[58] Field of Search ............... 358/209, 909, 335, 338, 358/339, 341, 906, 160; 360/36.2, 9.1, 14.1

[56] References Cited

U.S. PATENT DOCUMENTS 4,489,351 12/1984 d'Alayer de Los Temore d'Arc ................... 358/213
4,626,898 12/1986 Baba et al. .............................. 358/48
4,803,554 2/1989 Pape ...................................... 358/209

FOREIGN PATENT DOCUMENTS 54-140510 10/1979 Japan .

Primary Examiner—Howard W. Britton
Assistant Examiner—Tuan V. Ho
Attorney, Agent, or Firm—Frishauf, Holtz, Goodman & Woodward

[57] ABSTRACT

An image pick-up section generates an electronic still image signal. An A/D conversion section converts the electronic still image signal generated by the image pick-up section into a digital signal. A conversion section converts the digital signal converted by the A/D conversion section into a plurality of streams of signals. A recording section includes a plurality of memories for respectively storing the plurality of streams of signals converted by the conversion section. A control section includes a section for sequentially controlling at least the plurality of memories of the recording section in a write enable state.

4 Claims, 3 Drawing Sheets

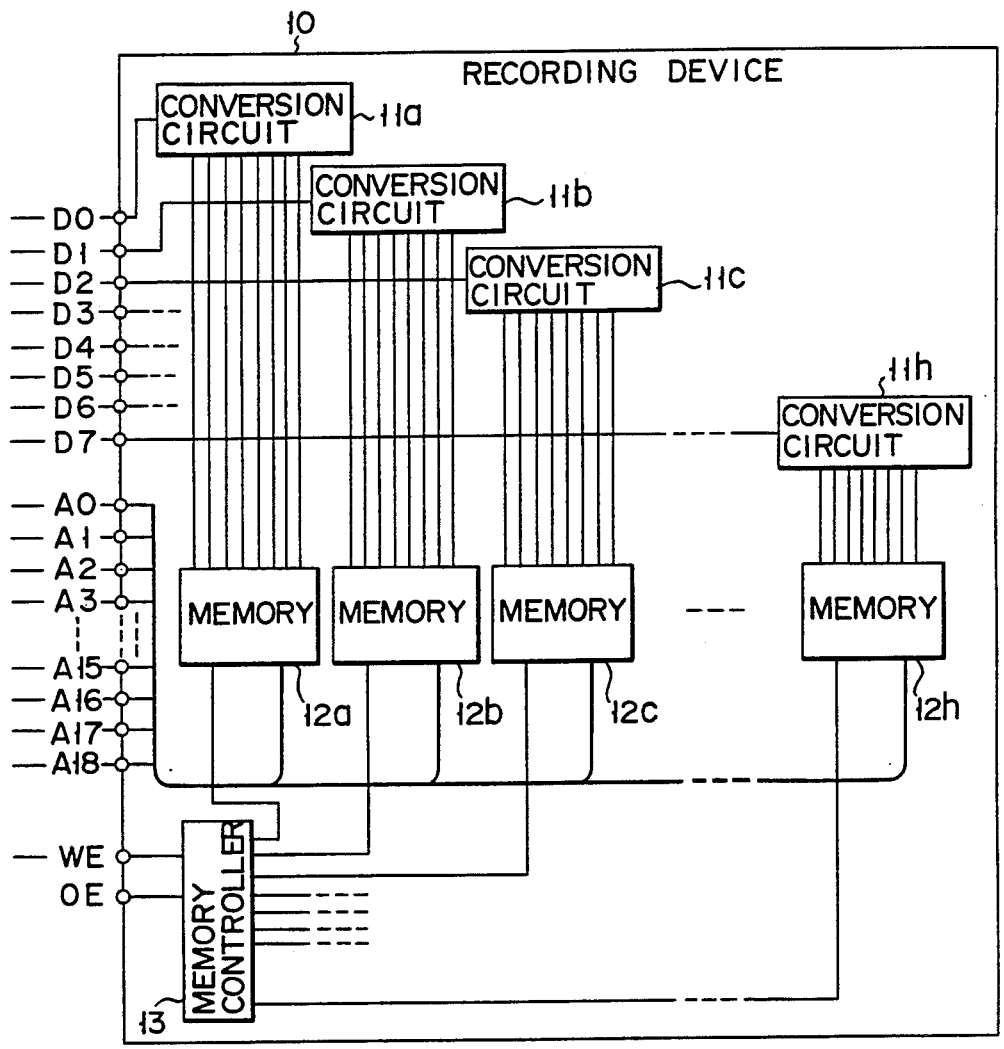
F I G. 2
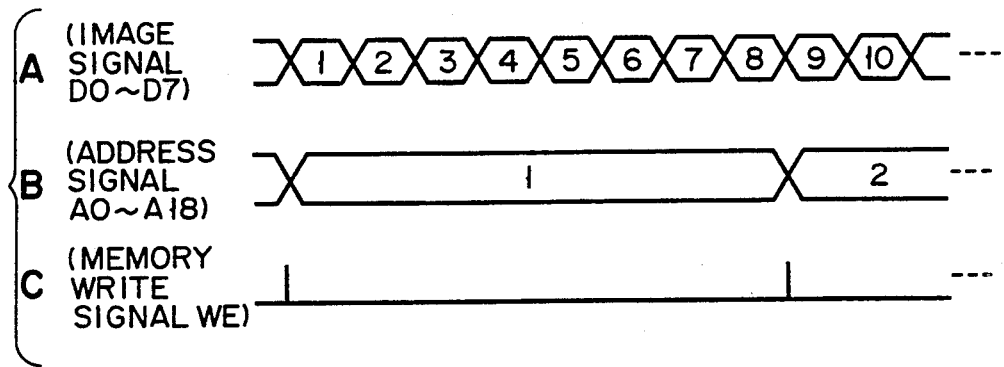
F I G. 3

ELECTRONIC STILL CAMERA FOR CONVERTING AND RECORDING STILL IMAGE SIGNAL INTO A PLURALITY OF STREAMS

BACKGROUND OF THE INVENTION

1. Field of the Invention

The present invention generally relates to an electronic still camera and, more particularly, relates to an electronic still camera for converting and recording a still image signal into a plurality of streams.

2. Description of the Related Art

A conventional electronic still camera converts an optical image projected by a lens 2 using a solid-state image pick-up element 1 such as a CCD (charged-coupled device) into an electrical signal, as shown in FIG. 5. This signal is subjected to desired processing by, e.g., an amplifier 3, a process circuit 4, and the like, and the processed signal is then recorded in a signal recording device 5 as a recording device. The signal recording device 5 comprises a recording medium such as a magnetic disk, an IC memory, or the like, and the above-mentioned signal is recorded on this recording medium.

In particular, when the recording medium is assumed to be a solid-state memory element such as an IC memory or a ferroelectric memory, the obtained video signal is converted to a digital signal by an A/D converter 6, and the digital signal is then recorded by the signal recording device 5. The signal recording device 5 is detachable with respect to an image pick-up unit 7 of an electronic still camera.

As the solid-state memory element used in the signal recording device 5 of the electronic still camera, a static random-access memory (SRAM), an electrically erasable programmable read-only memory (EEPROM), or the like is used. In particular, since the EEPROM is of a nonvolatile type, long-term recording can be attained without using a backup power source in the signal recording device 5.

However, the write speed of the EEPROM is as low as 1 ms/bit. For this reason, when the EEPROM is used in the electronic still camera to record a still video signal, about several hundreds of seconds are required to record a still image of one frame (about 2 Mbits) even if signal compression processing by, e.g., encoding is executed. Therefore, when the EEPROM is used as the recording medium of the signal recording device of the electronic still camera, a considerable wait time is required after a certain photographing operation until the next photographing operation can be started, and, hence, a continuous photography mode for performing continuous photographing operations cannot be realized.

For this reason, as disclosed in U.S. Pat. No. 4,803,554, a high-speed buffer memory such as a dynamic random-access memory (DRAM) may be arranged in the electronic still camera to realize continuous photographing operations. However, in this case, a buffer memory having a considerably large capacity is required, and a circuit scale is increased, resulting in high cost of the overall apparatus.

SUMMARY OF THE INVENTION

It is, therefore, an object of the present invention to provide a new and improved electronic still camera, which converts a still image signal into a plurality of streams and records them, so that a circuit scale can be remarkably reduced and total cost can be decreased since no large-capacity buffer memory is required.

According to the present invention, there is provided an electronic still camera comprising:

image pick-up means for generating an electronic still image signal;

A/D conversion means for converting the electronic still image signal generated by the image pick-up means into a digital signal;

conversion means for converting the digital signal converted by the A/D conversion means into a plurality of streams of signals;

recording means including a plurality of memories for respectively recording the plurality of streams of signals converted by the conversion means; and control means including means for sequentially controlling at least the plurality of memories of the recording means in a write enable state.

That is, according to the present invention, in order to achieve the above object, an electronic still camera which comprises a memory element for recording a digital still image signal, and a control circuit for controlling the memory element, comprises a conversion circuit for converting an input signal into a plurality of streams of signals. The conversion circuit may comprise a serial-to-parallel (S/P) converter or a decoder circuit.

In this manner, since the circuit for converting a signal into multi-stream signals is used, the digital still image signal can be simultaneously recorded in a plurality of memory elements within a short period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a detailed circuit diagram of a recording device used in the first embodiment of the present invention;

FIGS. 3A to 3C are timing charts for explaining write timings of an image signal in memories;

DETAILED DESCRIPTION OF THE PREFERRED EMBODIMENTS

Figure 1:
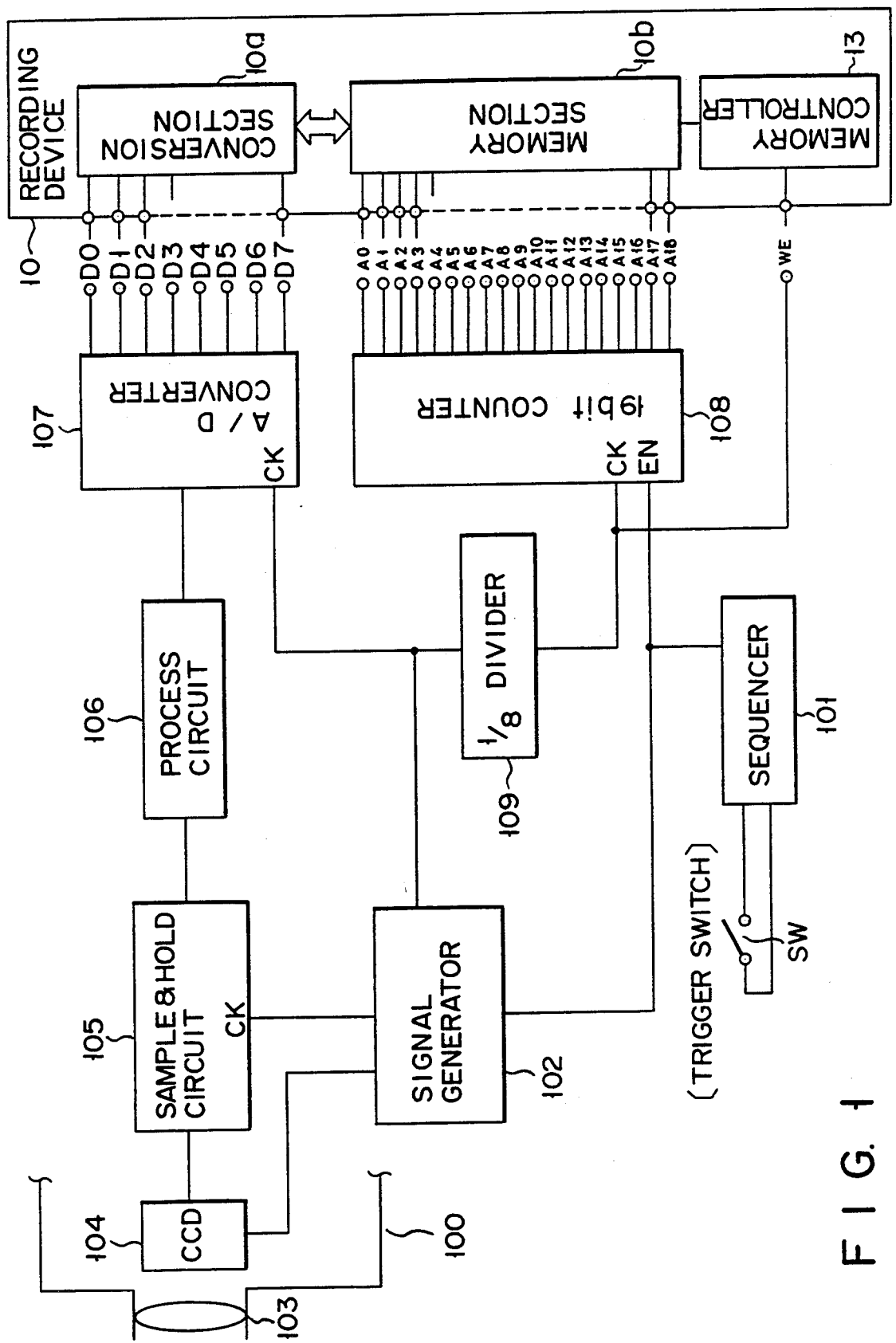
FIG. 1 is a schematic block diagram of an arrangement to which the first embodiment of an electronic still camera according to the present invention is applied.

Reference will now be made in detail to the presently preferred embodiments of the invention as illustrated in the accompanying drawings, in which like reference characters designate like or corresponding parts throughout the several drawings.

FIG. 1 shows a schematic arrangement to which the first embodiment of an electronic still camera according to the present invention is applied.

In FIG. 1, reference symbol SW denotes a trigger switch which is interlocked with a shutter (not shown) of an electronic still camera main body 100. When this trigger switch SW is depressed, a photographing operation of the electronic still camera main body 100 is started.

Reference numeral 101 denotes a sequencer which incorporates a microprogram and can generate a predetermined sequence pulse signal.

Therefore, when the photographing operation is started, an active enable signal is supplied from the sequencer 101 to a signal generator 102.

The signal generator 102 which is driven according to the enable signal supplies a drive pulse signal to a CCD image sensor 104 which receives a projected optical image from a lens 103. Thus, the CCD image sensor 104 outputs still image signal. The still image signal is sampled by a sample and hold circuit 105 in synchronism with the clock signal supplied from the signal generator 102.

The sampling output from the sample and hold circuit 105 is subjected to processing, e.g., mixing of a blanking signal, gamma correction, white clipping, and the like by the next process circuit 106, and the processed signal is then supplied to an A/D converter 107. The A/D converter 107 converts the processed analog output from the process circuit 106 into digital signals, i.e., 8 bits D0 to D7 in synchronism with the clock signal supplied from the signal generator 102, and outputs the digital signals.

In response to the enable signal from the sequencer 101, a 19-bit counter 108 also starts its operation. A clock signal supplied to the 19-bit counter 108 is obtained by frequency-dividing the clock signal to be supplied from the signal generator 102 to the A/D converter 107 to $\frac{1}{8}$ by a $\frac{1}{8}$ divider 109.

Therefore, outputs A0 to A18 from the 19-bit counter 108 are incremented by one step every time an 8-byte output is generated by the A/D converter 107.

The 8-bit digital signals from the A/D converter 107 are supplied to a conversion section 10a comprising a plurality of (eight in this case) conversion circuits corresponding to the number of bits, so that the 8-bit digital signals are stored in a recording device 10 after they are converted to a plurality of streams, as will be described later. The recording device 10 includes a memory section 10b comprising a plurality of (eight in this case) memories corresponding to the plurality of conversion circuits, as will be described later.

The outputs A0 to A18 from the 19-bit counter 108 are supplied to the memories of the memory section 10b as an address signal.

Note that the clock signal output from the $\frac{1}{8}$ divider 109 is supplied to a memory controller 13 for controlling the memory section 10b of the recording device 10 as a write enable (WE) signal, as will be described later. Every time the address signal is changed, the WE signal is output to execute write access to the memory section 10b.

The recording device 10 will be described in detail below.

FIG. 2 is a detailed circuit diagram of the recording device 10 used in the first embodiment of the present invention. The recording device 10 includes eight conversion circuits 11a, 11b, ..., 11h comprising serial-to-parallel (S/P) converters or decoders having an S/P conversion function as the conversion section 10a, eight memories 12a, 12b, ..., 12h each comprising an EEPROM as the memory section 10b, and the memory controller 13 for controlling signal I/Os to these memories.

One terminal of each of the conversion circuits 11a, 11b, ..., 11h is connected to a corresponding one of I/0 terminals D0 to D7 of the recording device 10, and the other terminal thereof is parallel-connected to a corresponding one of the memories 12a, 12b, ..., 12h. These memories 12a, 12b, ..., 12h are connected in series with address terminals A0 to A18 of the recording device 10 and the memory controller 13 in addition to the conversion circuits 11a, 11b, ..., 11h. The memory controller 13 is connected to a write enable terminal WE and an output enable terminal OE of the recording device 10.

A case will be described below wherein a video signal is recorded in the above arrangement. Digital still image signals are serially supplied from the A/D converter 107 of the electronic still camera main body 100 to the I/0 terminals D0 to D7. The serial still image signals are converted to 8-bit parallel signals by the eight conversion circuits 11a to 11h, and the parallel signals are simultaneously sent from the conversion circuits 11a to 11h to the memories 12a to 12h. On the other hand the memories 12a to 12h receive a memory address signal input from the address terminals A0 to A18, and a write enable signal input from the WE terminal in synchronism with transfer of the image signal.

Write timings of the image signals to the memories 12a to 12h will be described below with reference to FIGS. 3A to 3C.

The digital still image signals D0 to D7 are time-serially sent from the A/D converter 107 of the electronic still camera main body 100, as indicated by numbers 1, 2, 3, ... (FIG. 3A). After a total of 8 bytes of signals are transmitted, the memory write signal WE is sent (FIG. 3C), and 8-byte (8 bits × 8 signals = 64 bits) image signals are supplied from the conversion circuits 11a to 11h to the memories 12a to 12h. The 8-byte image signals are written in the memories 12a to 12h in accordance with the values of the addresses A0 to A18 defining an address signal which is set during a time period indicated by "1" (FIG. 3B). Subsequently, when a total of 8 bytes of image signals D0 to D7 are sent, as indicated by 9, 10, ..., 16, write access to the next memory address (values set during a time period indicated by "2") is executed. Similarly, memory write access is executed in units of 8 bytes.

A case will be described below wherein the image signals recorded in the recording device 10 are read out.

An output enable signal is applied from a reproduction device (not shown) to the memory controller 13 through the OE terminal. In response to the output enable signal, the recorded image signals are output from the memories 12a to 12h to the conversion circuits 11a to 11h as 8-bit parallel signals. In a read mode, these conversion circuits 11a to 11h serve as parallel-to-serial converters, and convert the 8-bit parallel signals output from the memories 12a to 12h into 1-bit serial signals. The conversion circuits then sequentially output these serial signals from the I/O terminals D0 to D7.

In this manner, according to the first embodiment, still image signals are simultaneously written in the eight memories in units of 8 bits. For this reason, a write time to the memories can be reduced to $\frac{1}{8}$ as compared to a case wherein no S/P conversion is performed, and continuous photographing operations can be realized.

When image signals stored in the memories are read out, image signals stored in the eight memories are simultaneously read out in units of 8 bits, and a read time can be reduced to ⅛ as in a write mode.

Since each memory comprises an EEPROM as a non-volatile memory, no backup power source is required in the recording device.

Figure 4:
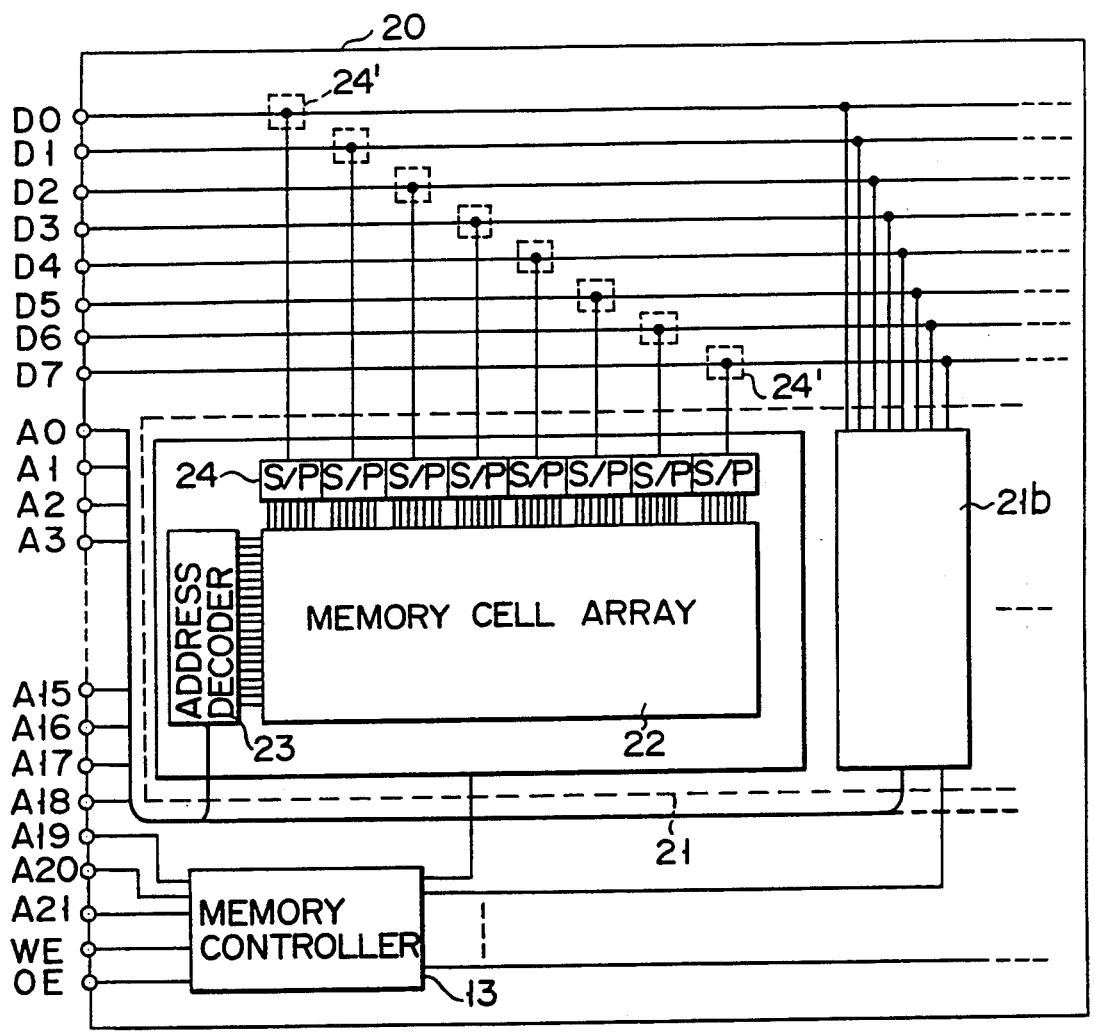
FIG. 4 is a detailed circuit diagram of a recording device portion as main part of the second embodiment of the present invention.
Figure 5:
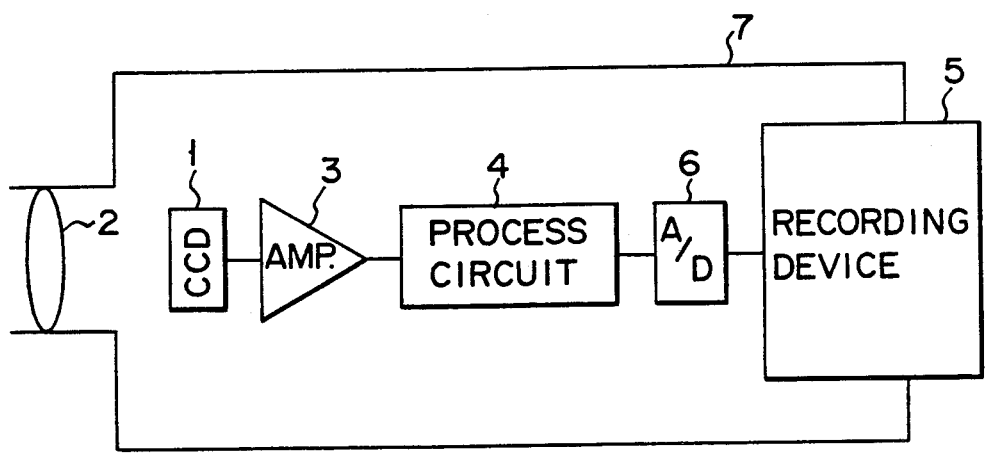
FIG. 5 is a diagram for explaining an arrangement of a conventional electronic still camera.

FIG. 4 is a circuit diagram showing main part of a recording device 20 according to the second embodiment of the present invention.

In the second embodiment, a difference from the recording device 10 of the first embodiment is that a memory section 21 is constituted by a plurality of memories 21a, 21b, ..., in each of which a predetermined number of conversion circuits 24 are integrated. In each of the plurality of memories 21a, 21b, ..., the conversion circuits 24 are integrated together with a memory cell array 22 and an address decoder 23. Each conversion circuit 24 serves as an S/P converter in a write mode of image signals. I/O terminals D0 to D7 are connected to the corresponding memory cells of the cell array 22 through the conversion circuits 24. In a read mode of image signals, the conversion circuits serve as P/S converters, and output parallel signals output from the plurality of memory cells as high-speed serial signals.

In FIG. 4, a signal for selecting one of the plurality of memories 21a, 21b, ..., is input to address terminals A19 to A21, and the same signals as in the first embodiment are input to other terminals.

According to the second embodiment, since the conversion circuits 24 are integrated in each memory 21, the number of terminals of each memory does not restrict an increase in the number of bits of parallel conversion. As a result, a write speed can be greatly reduced.

The present invention has been described with reference to the first and second embodiments. However, the present invention is not limited to the above embodiments, and various changes and modifications may be made within the spirit and scope of the invention.

For example, in each embodiment, conversion circuits are arranged outside or inside the memory section but may be arranged outside and inside the memory section by arranging conversion circuits 24' indicated by broken lines in FIG. 4. When the conversion circuits are arranged inside and outside the memory section in this manner, the converters outside the memory section convert 1-bit signals into 8-bit signals, and converters inside the memory section convert 1-bit signals into 64-bit signals. A still image of one frame of the electronic still camera consists of about 2 Mbits, and is compressed to ¼ by an encoder such as DPCM unit to obtain a data volume of 0.5 Mbits, i.e., 64 Kbytes. With this data volume, when the above-mentioned conversion operations are executed, $$65536 \div 8 \div 64 = 128$$

Thus, a still image of one frame can be stored by 128 memory write cycles. A write speed of an EEPROM is normally about 1 ms, and write access can be completed within 0.128 sec. Thus, a sufficient photographing speed can be obtained as a still camera.

As described in detail above, according to the present invention, even when memory elements used in a recording device of an electronic still camera have a low write speed like EEPROMs, conversion circuits for converting a signal into a plurality of streams of signals are arranged without using a large-capacity buffer unlike in a conventional camera, and a video signal can be simultaneously written in a plurality of memories in a recording section, thus providing an electronic still camera which can attain high-speed write access while maintaining a small circuit scale and low total cost, and can realize continuous photographing operations.

What is claimed is:

1. An electronic still camera, comprising: image pick-up means for generating an electronic still image signal;

analog-to-digital (A/D) conversion means for converting the electronic still image signal generated by said image pick-up means into a corresponding digital signal;

conversion means for converting the digital signal converted by said A/D conversion means into a plurality of streams of signals;

recording means including a plurality of memories for respectively recording the plurality of streams of signals converted by said conversion means; and control means including means for sequentially controlling at least said plurality of memories of said recording means in a write enable state, wherein said conversion means includes a predetermined number of conversion circuits integrated in said plurality of memories, respectively.

2. A camera according to claim 1, wherein said recording means includes electrically erasable programmable read-only memories (EEPROMs) for respectively recording the plurality of streams of signals.

3. A camera according to claim 1, wherein said conversion means includes a decoder.

4. A camera according to claim 1, wherein each of said predetermined number of conversion circuits includes a serial-to-parallel converter.

* * * * *